US011643735B2

(12) United States Patent
Licht

(10) Patent No.: US 11,643,735 B2
(45) Date of Patent: May 9, 2023

(54) METHODS AND SYSTEMS FOR PRODUCTION OF ELONGATED CARBON NANOFIBERS

(71) Applicant: C2CNT LLC, Venice, FL (US)

(72) Inventor: Stuart Licht, Venice, FL (US)

(73) Assignee: C2CNT LLC, Venice, FL (US)

(\*) Notice: Subject to any disclaimer, the term of this patent is extended or adjusted under 35 U.S.C. 154(b) by 7 days.

(21) Appl. No.: 16/414,503

(22) Filed: May 16, 2019

(65) Prior Publication Data
US 2019/0271088 A1    Sep. 5, 2019

Related U.S. Application Data

(63) Continuation of application No. PCT/US2017/061861, filed on Nov. 15, 2017.
(Continued)

(51) Int. Cl.
*C25B 1/135*    (2021.01)
*C25B 1/00*    (2021.01)
(Continued)

(52) U.S. Cl.
CPC ............ *C25B 1/00* (2013.01); *B01J 23/755* (2013.01); *B01J 23/8926* (2013.01); *B01J 23/8993* (2013.01); *C01B 32/16* (2017.08); *C01B 32/162* (2017.08); *C25B 1/135* (2021.01); *C25D 9/02* (2013.01); *C25D 9/08* (2013.01); *D01F 9/12* (2013.01); *B82Y 30/00* (2013.01); *B82Y 40/00* (2013.01); *C01B 2202/34* (2013.01)

(58) Field of Classification Search
CPC ......... C25B 1/00; C25B 1/135; C01B 32/162; C01B 32/16; C01B 2202/34; B01J 23/8926; B01J 23/755; B01J 23/8993; C25D 9/08; C25D 9/02; D01F 9/12; B82Y 30/00; B82Y 40/00
See application file for complete search history.

(56) References Cited

U.S. PATENT DOCUMENTS

2014/0202874 A1\* 7/2014 Elgammal ............... C25B 15/08
                                                            205/555
2016/0115600 A1\* 4/2016 Stiller ...................... H01B 1/04
                                                            252/502

FOREIGN PATENT DOCUMENTS

CN    105506665    \*    4/2016    ............... C25B 1/00
CN    105924174    \*    9/2016    ............... B01J 20/20
(Continued)

OTHER PUBLICATIONS

J. Ren, et al., "One-Pot Synthesis of Carbon Nanofibers from $CO_2$", Nano Letters, pubs.acs.org/NanoLett; 2015; 7 pgs.
(Continued)

*Primary Examiner* — Stefanie S Wittenberg
(74) *Attorney, Agent, or Firm* — Blank Rome LLP

(57) ABSTRACT

A system and process for producing macro length carbon nanotubes is disclosed. A carbonate electrolyte including transition metal powder is provided between a nickel alloy anode and a nickel alloy cathode contained in a cell. The carbonate electrolyte is heated to a molten state. An electrical current is applied to the nickel alloy anode, nickel alloy cathode, and the molten carbonate electrolyte disposed between the anode and cathode. The resulting carbon nanotube growth is collected from the cathode of the cell.

36 Claims, 9 Drawing Sheets

Related U.S. Application Data

(60) Provisional application No. 62/423,052, filed on Nov. 16, 2016.

(51) Int. Cl.

| | | |
|---|---|---|
| *D01F 9/12* | (2006.01) | |
| *C01B 32/162* | (2017.01) | |
| *C01B 32/16* | (2017.01) | |
| *B01J 23/89* | (2006.01) | |
| *C25D 9/08* | (2006.01) | |
| *B01J 23/755* | (2006.01) | |
| *C25D 9/02* | (2006.01) | |
| *B82Y 30/00* | (2011.01) | |
| *B82Y 40/00* | (2011.01) | |

(56) References Cited

FOREIGN PATENT DOCUMENTS

| WO | WO-2011111791 | * | 9/2011 | ............. B82Y 30/00 |
|---|---|---|---|---|
| WO | WO-2016/138469 A1 | | 9/2016 | |
| WO | WO-2017/141044 A1 | | 8/2017 | |

OTHER PUBLICATIONS

"Monel alloy 400", (Special Metals Corporation); Feb. 2005; 1 pg.

H. Wu, et al., "One-Pot Synthesis of Nanostructured Carbon Materials from Carbon Dioxide via Electrolysis in Molten Carbonate Salts", ScienceDirect; www.elsevier.com/locate/carbon; Carbon, vol. 106, 2016; pp. 208-217.

I. A. Novoselova, et al., "Electrolytic Synthesis of Carbon Nanotubes from Carbon Dioxide in Molten Salts and their Characterization", ScienceDirect, www.elsevier.com/locate/physc; Physica E; vol. 40, 2008; pp. 2231-2237.

"Inconel Alloy 718", (Special Metals Corporation); Sep. 2007; 1 pg.

M. Johnson, et al., "Carbon Nanotube Wools Made Directly form $CO_2$ by Molten Electrolysis: Value Driven Pathways to Carbon Dioxide Greenhouse Gas Mitigation", ScienceDirect; www.journals.elsevier.com/materials.today-energy/; Materials Today Energy; vol. 5, 2017; pp. 230-236.

M. Johnson, et al., "Data on SEM, TEM and Raman Spectra of Doped, and Wool Carbon Nanotubes made Directly from $CO_2$ by Molten Electrolysis", ScienceDirect; www.elsevier.com/locate/dlb; Data in Brief, vol. 14, 2017; pp. 592-606.

S. Licht, et al., "Carbon Nanotubes Produced from Ambient Carbon Dioxide for Environmentally Sustainable Lithium-Ion and Sodium-Ion Battery Anodes", ACS Central Science; http://pubs.acs.org/journal/acscii; 2016; 7 pgs.

International Search Report & Written Opinion for PCT/US17/61861, dated Feb. 13, 2018, 13 pgs.

* cited by examiner

| Trade Name | ASTM/AISI Alloy type | UNS | %Cu | %Al | %Ti | %Fe | %Mn | %Si | %Ni |
|---|---|---|---|---|---|---|---|---|---|
| Monel 400 | B 127, B 164 | N04400 | 28-34 | | | 2.5 max | 2.0 max | | 63 min |
| Monel 401 | | N04401 | 28-34 | | | 2.5 max | 2.0 max | | 63 min |
| Monel 404 | | N04404 | 28-34 | | | 2.5 max | 2.0 max | | 63 min |
| Monel K-500 | B 865 | N05500 | 27-33 | 2.3-3.15 | 0.35-0.85 | 2.0 max | 1.5 max | | 63 min |
| Monel 405 | B 164 | N04405 | 28-34 | | | 2.5 max | 2.0 max | 0.5 max | 63 min |

FIG. 3A

| Inconel | Element (% by mass) | | | | | | | | | | | | | | |
|---|---|---|---|---|---|---|---|---|---|---|---|---|---|---|---|
| | Ni | Cr | Fe | Mo | Nb | Co | Mn | Cu | Al | Ti | Si | C | S | P | B |
| 600 | 72.0 | 14.0-17.0 | 8.0-10.0 | | | | 1.0 | 0.5 | | | 0.5 | 0.15 | 0.015 | | |
| 617 | 44.2-56.0 | 20.0-24.0 | 3.0 | 8.0-10.0 | | 10.0-15.0 | 0.5 | 0.5 | 0.8-1.5 | 0.6 | 0.5 | 0.15 | 0.015 | 0.015 | 0.006 |
| 625 | 58.0 | 20.0-23.0 | 5.0 | 8.0-10.0 | 3.15-4.15 | 1.0 | 0.5 | | 0.4 | 0.4 | 0.5 | 0.1 | 0.015 | 0.015 | |
| 690 | 59.5 | 30 | 9.2 | | | | 0.35 | 0.01 | 0.02 | | 0.35 | 0.019 | 0.003 | | |
| 718 | 50.0-56.0 | 17.0-21.0 | balance | 2.8-3.3 | 4.75-5.5 | 1.0 | 0.35 | 0.2-0.8 | 0.65-1.15 | 0.3 | 0.35 | 0.08 | 0.015 | 0.015 | 0.006 |
| K-750 | 70.0 | 14.0-17.0 | 5.0-9.0 | | 0.7-1.2 | 1.0 | 1.0 | 0.5 | 0.4-1.0 | 2.25-2.75 | 0.5 | 0.08 | 0.01 | | |

FIG. 3B

METHODS AND SYSTEMS FOR PRODUCTION OF ELONGATED CARBON NANOFIBERS

PRIORITY

The present application is a continuation of PCT/US2017/061861, filed Nov. 15, 2017, which claims priority to U.S. Provisional Patent Application No. 62/423,052, filed on Nov. 16, 2016. Those applications are hereby incorporated by reference in their entirety.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to the production of carbon nanotubes, and specifically to production of elongated macroscopic length carbon nanotubes from a molten carbonate electrolyte.

BACKGROUND

Prior to the recognition of a variety of unique carbon nanoscopic structures such as fullerenes, nanotubes, and nano-fibers starting in 1985, the reduction of carbonates to (macroscopic) carbons in inorganic molten electrolytes from hydroxides and a barium chloride/barium carbonate melt was recognized as early as the late 1800s. Today, the principal methods of carbon nano-fiber preparation are spinning of polymer nano-fiber precursors followed by carbonization heat treatment and catalytic thermal chemical vapor deposition (CVD) growth. CVD growth of carbon nano-fibers is catalyzed by metals or alloys, which are able to dissolve carbon to form metal carbides including nickel, iron, cobalt, chromium, and vanadium. Low levels of the catalyst relative to the carbon nano-fibers are required, and prominent catalyst nanoparticles are observed at the fiber tip, as well as catalyst clusters along the fiber that have migrated during carbon nano-fiber growth. A variety of carbon nano-fiber morphologies have been observed including linear, coil, and sphere clustered carbon nano-fibers. These techniques have been expensive, are difficult to implement on a large scale, and result in the current high cost of the carbon nano-fibers.

Carbon nanotubes have great potential as a material resource, with applications ranging from reinforced composites, capacitors, lithium-ion batteries, nanoelectronics, and catalysts to the principal component of lightweight, high strength building materials due to their characteristic superior strength, electrical and thermal conductivity, flexibility and durability. Organo-metallic reactants using chemical vapor deposition, or arc discharge, or polymer pulling/carbonization are amongst the principal worthwhile, but costly methods of production of carbon nanofibers or nanotubes. One recent innovation is the use of a molten electrolysis method to produce carbon nanotubes. In this process, a molten carbonate electrolyte is disposed between a cathode and anode. $CO_2$ is injected and an electrical current is applied to the cathode. This process produces carbon residue on the cathode that may include carbon nanotubes.

The cathode in the molten electrolysis production of carbon nanotubes is the electrode upon which this carbon product is deposited. Previously, the state of the art considered that, other than being conductive and stable, the composition of the cathode was irrelevant. The reasoning behind the assumption is that upon electrolysis all cathodes become coated with transition metal nuclei sites and electrodeposited carbon, and effectively become carbon electrodes. Therefore it was widely assumed that the undermost original cathode material becomes irrelevant for the purposes of the electrolysis. The previous known cathodes only produced high quality short (microscopic length) carbon nanotubes, formed by short term electrolysis such as for short or long term electrolyses. Long term electrolysis produced thicker diameter carbon nanotubes. However, the only carbon nanotubes produced were not straight, not uniform and not suitable to produce carbon composite or carbon strength. In those prior conditions, long-term electrolysis led towards proportionally thicker (but uncontrolled morphology) diameters, but not to proportionally longer length structures.

Thus, there is a limitation to the length of carbon nanotubes that can be formed on a substrate by the molten electrolysis method in general. A substantial challenge to the use of short length carbon nanotubes is that while they maintain exceptional qualities of strength, thermal and electrical conductivity, and flexibility, they cannot be woven together. These short length carbon nanotubes are less likely candidates for the largest carbon nanotube market consisting of high strength carbon cloths and carbon composites. Inexpensive, high strength carbon composites as a lighter weight replacement for steel and aluminum comprise the principal potential market for these materials and would provide a major source to store transformed anthropogenic $CO_2$.

Thus, there has been a demand for production of carbon nanotubes that have greater length to increase the utility of the carbon nanotubes. Hence, the lack of uniform long length carbon nanotubes produced by molten carbonate electrolysis of carbon dioxide remains a considerable challenge to their deployment. Previous barriers to short length carbon nanotubes being produced from molten carbonate carbon nanotube synthesis from $CO_2$ are being overcome. This allows for one-pot molten electrolyte production of long length, uniform carbon nanotubes, suitable for weaving into carbon composites and carbon cloths. However, no carbon nanotube growth elongation element to permit production of macroscopic length carbon nanotubes has been investigated.

Previous attempts to form long carbon nanotubes resulted in distorted carbon nanotubes. In previous studies, carbon nanotubes were uniform and straight and up to 0.03 mm in length when formed during short duration (2 hour) electrolyses in molten carbonate. Although ten times longer (20 hour) electrolysis carbon nanotube products were thicker, they were not much longer and the resulting carbon nanostructures were highly convoluted and not uniform. The specific iron cathode used in these electrolyses is V2568 18 gauge (0.04 inch diameter) galvanized steel.

The electrolysis method to produce carbon nanotube product is premised on the presumed lack of effect of the cathode composition in $CO_2$ electrolytic splitting in molten carbonates to carbon and oxygen. The electrolysis method assumes that the cathode could be any conductive, stable material because during electrolysis it becomes carbon coated and simply acts as a carbon electrode. That is, any such cathode such as steel, iron, nickel, platinum, a metal alloy or carbon, effectively becomes a carbon electrode during the deposition.

For example, it was previously assumed that nickel foil and nickel alloy comprise effective cathodes, in lieu of platinum. Replacement of platinum, with nickel, nickel alloys (inconel and monel), titanium, and carbon graphite rod was proposed as all these materials assumed to be effective carbon-capture cathode materials. The assumed lack of difference between platinum and steel cathodes for $CO_2$ splitting in molten carbonates was reiterated in different studies. Similarly, an iron cathode, in lieu of a platinum cathode, were both assumed to be equivalent for the deposition of iron from lithium carbonate electrolytes. The assumed lack of difference between platinum and steel cathodes for $CO_2$ splitting in molten carbonates was reiterated in more recent studies.

Thus, there is a need for an efficient method of producing macroscopic length carbon nanotubes from molten carbonate materials. There is also a need to select alloys for a cathode in the electrolysis process that facilitate longer carbon nanotube growth. There is a need to provide alternative carbon nanotube transition metal nuclei growth paths from molten $Li_2CO_3$ to facilitate growth of carbon nanotubes from electrolysis.

SUMMARY

According to one example, a method for producing a carbon nanotube is disclosed. A carbonate electrolyte is heated to obtain a molten carbonate electrolyte. The molten carbonate electrolyte is disposed between an anode and a cathode in a cell. A carbon nanotube growth elongation element such as a Monel cathode or a Nichrome anode is included in the cell. An electrical current is applied to the cathode and the anode in the cell. Carbon nanotube growth is collected from the cathode of the cell.

Another example is a method for producing a macro length carbon nanotube. A carbonate electrolyte including transition metal powder is provided between a nickel alloy anode and a nickel alloy cathode contained in a cell. The carbonate electrolyte is heated to a molten state. An electrical current is applied to the nickel alloy anode, the nickel alloy cathode, and the molten carbonate electrolyte disposed between the anode and cathode. The resulting carbon nanotube growth is collected from the cathode of the cell.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIGS. 3A and 3B are tables of different Monel and Inocel alloys that may be used for the cathode in the system in FIG. 1A;

Figure 1A:
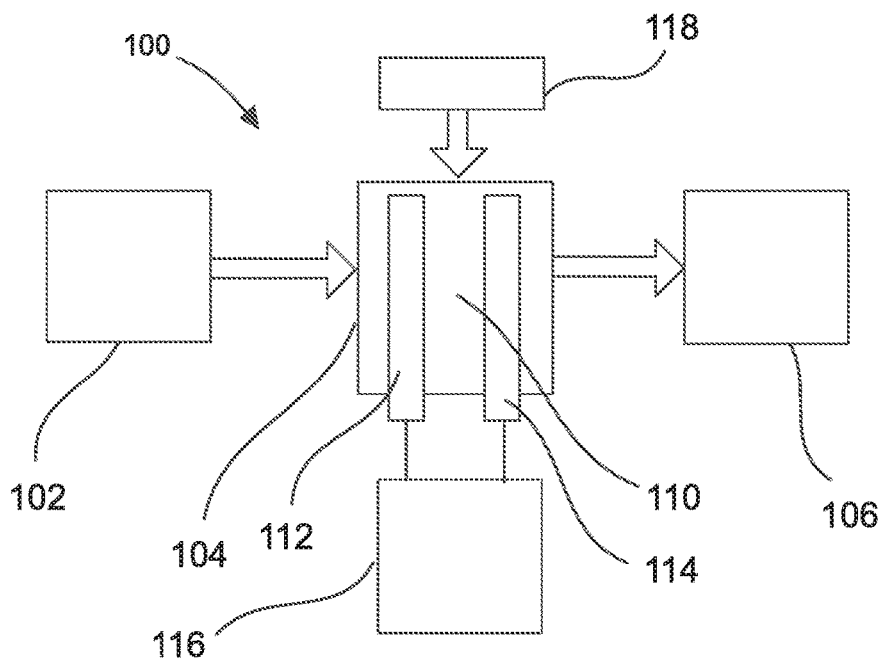
FIG. 1A is a block diagram of an electrolysis system to produce carbon nanotubes from carbonate.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost." "substantially," "approximately," and the like, can be used herein to mean "at, near, or nearly at," or "within 3-5% of," or "within acceptable manufacturing tolerances," or any logical combination thereof, for example.

FIG. 1A is a block diagram of an example system 100 that produces macrolength carbon nanotubes from carbonate materials and injected $CO_2$. The system 100 includes a carbonate furnace 102, an electrolysis chamber 104, and a collector 106. Although the furnace 102, the electrolysis chamber 104, and collector 106 are shown as separate components in FIG. 1A, it is to be understood that they can be in the same physical structure. The electrolysis chamber 104 includes a chamber 110 (cell) that holds a molten carbonate electrolyte produced by heating carbonate in the furnace 102. An anode 112 and a cathode 114 are coupled to a power source 116. The anode 112 and the cathode 114 are inserted in the chamber 110. $CO_2$ is injected into the molten carbonate from a $CO_2$ source 118. The $CO_2$ is injected into the molten carbonate electrolyte to react with the oxide and renew, rather than consume, the carbonate, for the overall electrolysis reaction as $CO_2$ converted to $O_2$ at the anode 112 and carbon nano-materials at the cathode 114. There may be a variety of $CO_2$ sources for the $CO_2$ source 118.

The carbonate furnace 102 heats a carbonate electrolyte such as pure $Li_2CO_3$ to the respective melting point to produce molten carbonate electrolyte. There may be a variety of mechanisms to power the carbonate furnace 102 such as by solar energy or conventional power plants. Transition metal is added via a disperser to serve as a catalyst. The molten carbonate electrolyte is subjected to electrolysis by being inserted between the anode 112 and the cathode 114 in the electrolysis chamber 104.

Figure 1B:
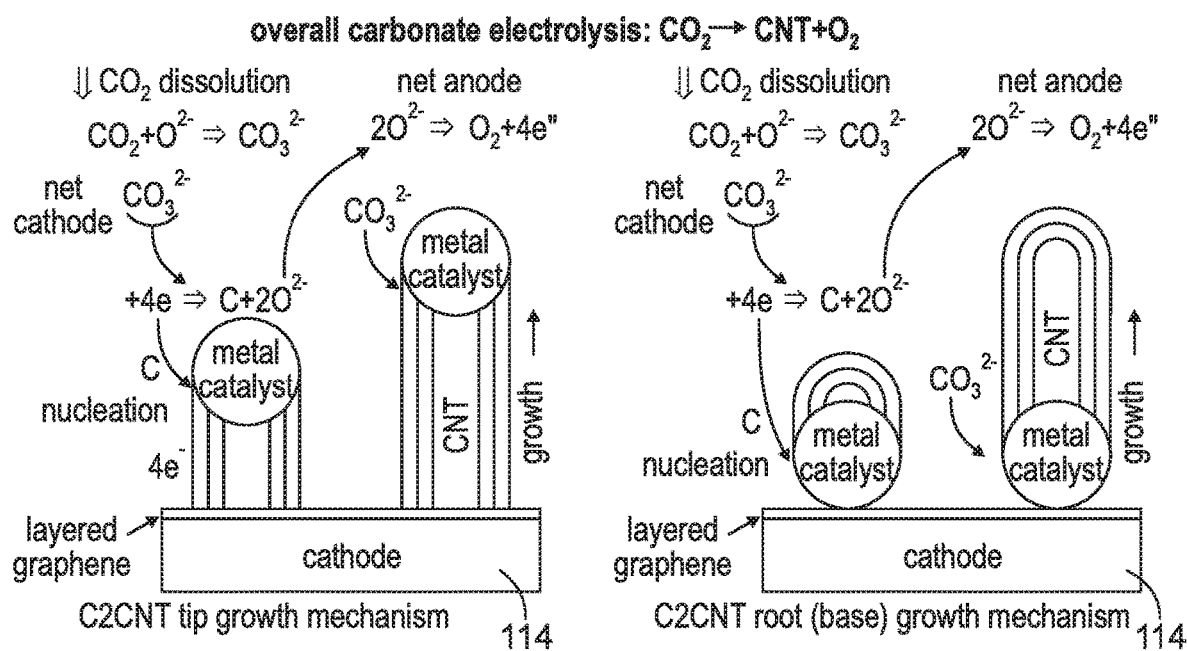
FIG. 1B is an illustrative diagram of the production of carbon products without being bound to any theory or such mechanism using the system in FIG. 1A.

As may be seen in reference with FIG. 1B, the resulting reaction separates carbon from the carbonate and leaves carbon product such as carbon nanotubes on the cathode 114 from the nucleation sites. Such growth may occur as a tip growth mechanism as shown in FIG. 1B or a root growth mechanism as shown in FIG. 1B. Of course other growth mechanisms may be possible. The resulting carbon product is collected in the collector 106 while oxygen is produced on the anode 112. Carbon nanotubes may be separated from the resulting carbon product. The separated carbon nanotubes may be cleaned with a solvent or separated from the molten electrolyte by high temperature filtration.

In this example, a carbon nanotube growth elongation element is added to the cell that holds the anode 112, cathode 114 and the carbonate electrode. Such carbon nanotube growth elongation elements may include nickel; copper; chromium; iron; brass; manganese; titanium; zirconium; molybdenum; tantalum; cobalt; silicon; carbon; and alloys and mixtures thereof. As will be explained below, the carbon nanotube growth elongation element may be the cathode material, the anode material or transition metal or the salt of a transition metal added to the electrolyte. In this example, the cathode 114 is fabricated from Monel or Inconel alloy. The Monel alloy is an alloy of nickel and copper and small amounts of iron, manganese, carbon and silicon. The carbonate electrolyte is $Li_2CO_3$ and includes a carbon nanotube elongation element such as 3-7 μm diameter Ni metal powder initially added to the carbonate electrolyte in the disperser. Different carbonate electrolytes such as lithium carbonate; sodium carbonate; potassium carbonate; strontium carbonate; rubidium carbonate; cesium carbonate; barium carbonate; and calcium carbonate may also be used. The anode 112 is fabricated by a nickel-chromium alloy in this example. The resulting carbon product is straight carbon nanotubes having macroscopic length.

Figure 2A:
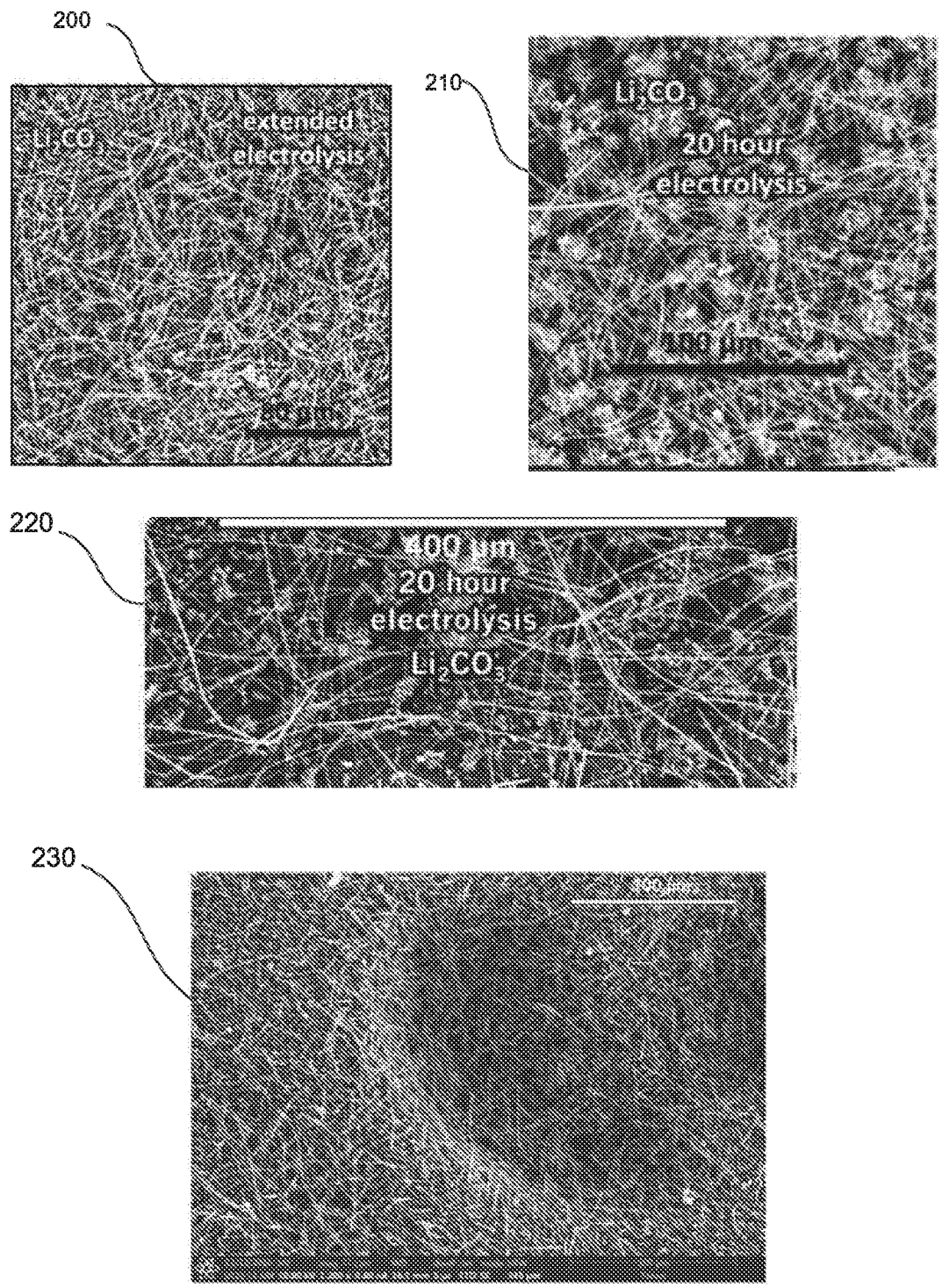
FIG. 2A is a series of SEM images of carbon nanotubes produced using a Monel cathode.

Monel cathodes used in the process described above in FIG. 1A produce uniform, very long (macroscopic, >1 mm in length) carbon nanotubes, proportional in length to the electrolysis time (under other fixed conditions of temperature, electrolyte and current density). FIG. 2A shows a series of SEM microscopy images 200, 210, 220 and 230 of carbon nanotubes produced using a Monel cathode. The electrolysis using the system 100 in FIG. 1A is conducted in 52 g of 770° C. molten lithium carbonate, and the anode 112 is situated horizontally above the cathode 114 and is also 5 cm². Additionally, these new electrolyses are conducted with 3-7 μm diameter Ni metal powder initially added to the electrolyte, and which as delineated below effectively replaces the need for zinc as was used in the prior galvanized steel electrode. SEM is generally more suitable for the measurement of microscopic, rather than macroscopic sizes, but optical microscopy (not shown) indicates that many of the carbon nanotubes in the image 200 and the image 220 are over 1 mm long. The carbon fiber can be made very long such as up to 5 mm, up to 1 cm, up to 2 cm, up to 5 cm, up to 10 cm, or up to 1 meter or longer.

The image 200 in FIG. 2A shows a washed carbon product from the process. The image 210 shows partially washed carbon product samples which still retain some electrolyte. As seen in the image 220, a washed cathode product produced subsequent to a lower charge (6 Ah, rather than 12 Ah) electrolysis exhibits proportionally shorter carbon nanotubes. The image 230 shows an SEM image of B-doped carbon nanotubes formed by 6 Ah electrolysis using a 5 cm² Monel cathode in 5 g $LiBO_2$ and 50 g $Li_2CO_3$ at 770° C.

A further expression of the new morphology is that rather than the particle/powder nature of all prior products, the washed cathode of the product now exhibits a fleece-like or cotton-like fibrous character. This expanded, fibrous character is similar to other materials used for example in combining, braiding or weaving into wire, cables, wires or cloths.

Figure 2B:
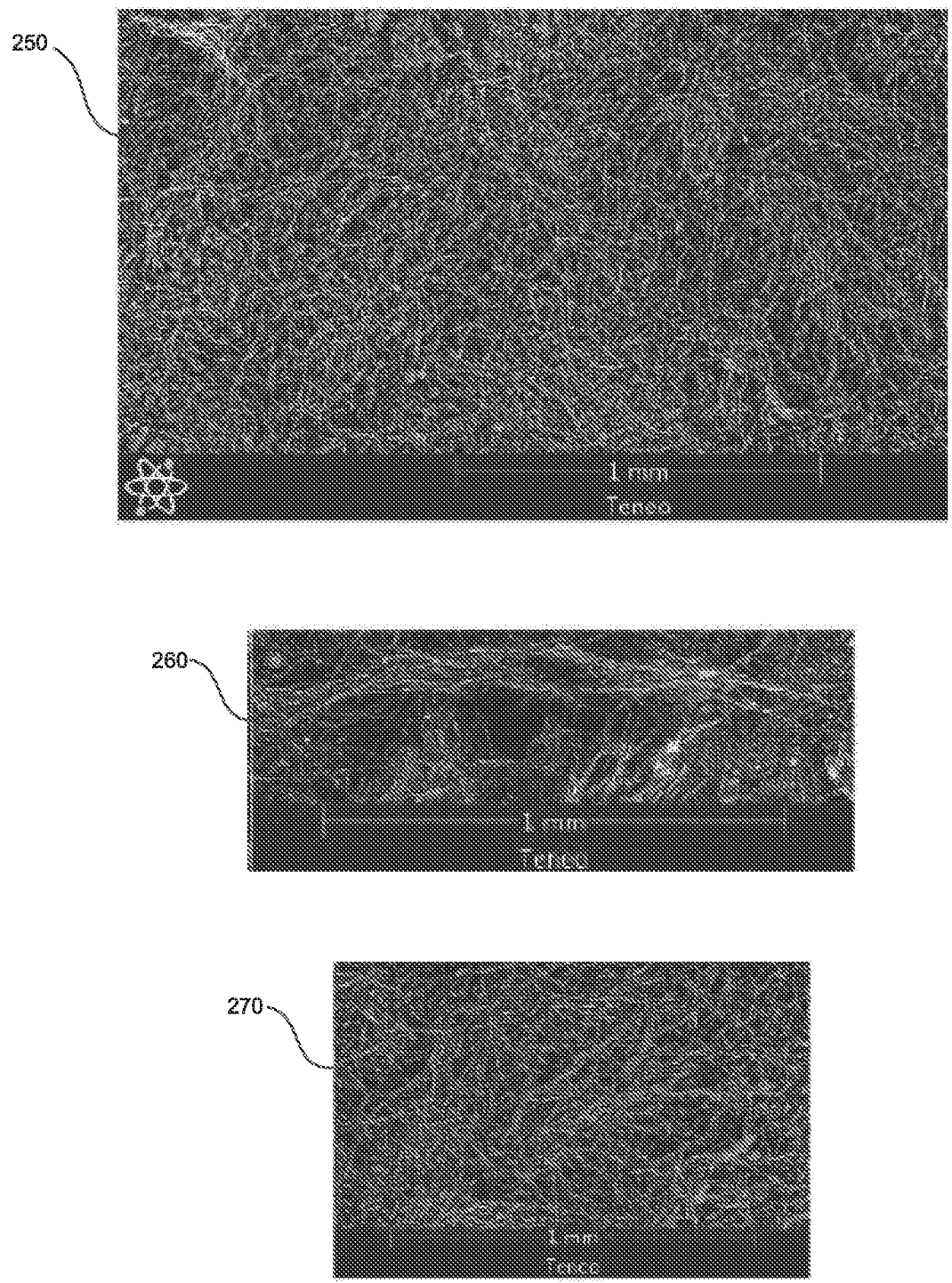
FIG. 2B is a series of SEM images of carbon nanotube wool product produced using a Monel cathode.

FIG. 2B shows SEM images 250, 260 and 270 of carbon nanotube wool products produced at a cathode from $CO_2$ during replicate syntheses of 770° C. $LiCO_3$ electrolysis using the system 100 in FIG. 1A. Electrolysisis was performed for 18 hours at 0.1 A cm$^{-2}$ (1.8 Ah cm$^{-2}$) between a NiChrome anode and a Monel cathode. The carbon product shown in the images 250, 260 and 270 differs from that of prior molten carbonate electrosyntheses. This product is wool-like and fluffy, rather than powdery or sandy. As shown in the images 250, 260 and 270, this difference is evidenced by the macroscopic length (100 fold longer) than the prior 5-50 μm length of the carbon nanotubes from previous syntheses. As with previous, optimized carbon dioxide to carbon nanotube electrosyntheses, the typical carbon dioxide to carbon nanotube coulombic yield (in which 100% is equivalent to a 4 e– conversion of all applied charge reducing the tetravalent carbon) is >90% (and higher with careful product recovery). Additionally, in the case of the new synthesis the carbon product consists of ~95% macroscopic carbon nanotubes. As shown in the images 250, 260 and 270, the carbon nanotube product range from 0.4-1.2 mm in length. Optical microscopy (not shown), rather than SEM images, of the same product shows several outlier carbon nanotubes that are over 2 mm long.

While Monel 400 alloy is preferred for the cathode 114 in FIG. 1A, a number of Monel and Inconel alloys may be used for the cathode 114. These materials include at least the following Monel alloys shown in the table in FIG. 3A. The alloys in FIG. 3A include Monel 400, Monel 401, Monel 404 Monel K-500 and Monel 405. These materials also include at the following Inconel alloys shown in the table in FIG. 3B. The Inconel alloys include Inconel 600, Inconel 617, Inconel 625, Inconel 690, Inconel 718 and Inconel X-750 alloys. In addition to the Monel and Inconel alloys, brass alloy, and in particular high zinc content brass alloys such as Muntz metal (approximately 40% zinc and 60% copper) may be used for the cathode 114 in FIG. 1A to generate elongated carbon nanotubes. The zinc content makes the alloy softer with better surface transportation and allows easier harvesting of the carbon nanotubes.

Previously, the one exception to the assumption of composition irrelevance of the conductive cathode was when a steel cathode was coated with zinc (galvanized steel) as zinc has a 420° C. melting point which is less than the temperature of the molten electrolyte (700° C.) in which the cathode is immersed. The zinc coated cathode results in the liquid zinc leaving the electrode in the process and helps initiate the dissolution of nickel from the anode or formation of carbon on the cathode. Of course other suitable temperature ranges for a molten electrolyte such as between about 150° C. and about 300° C.; between about 300° C. and about 500° C.; between about 500° C. and about 700° C.; between about 700° C. and about 800° C.; between about 750° C. and about 790° C.; or between about 800° C. and about 900° C. may be used.

The example process is an alternative to (zinc) galvanization of the cathode. The example process produces more effective carbon nanotubes, as well as broadens the range of materials for cathodes. Instead of zinc coating, fine nickel (Ni) powder is added to the top of the electrolyte prior to heating, and falls through the electrolyte. The direct addition of Ni metal powder to the electrolyte provides sharper control of the initiation of carbon nanotube growth than the previous methodology which utilized the release of nickel during the initial gradual formation of a stable nickel oxide layer at the anode. This process had been observed to require a gradual increase of electrolysis current to yield a high formation of the carbon nanotube product at the cathode. With the direct addition of n powder to the electrolyte, the higher steady-state electrolysis current can be initially and continuously applied without the need for that lower current density activation of carbon nanotube growth. Other transition metal powders or their salts may be added to the electrolyte. Such transition metals may be chromium; iron; cobalt; manganese; titanium; zirconium; copper; vanadium; zinc; molybdenum; scandium; ruthenium; tantalum; and alloys thereof.

Figure 4A:
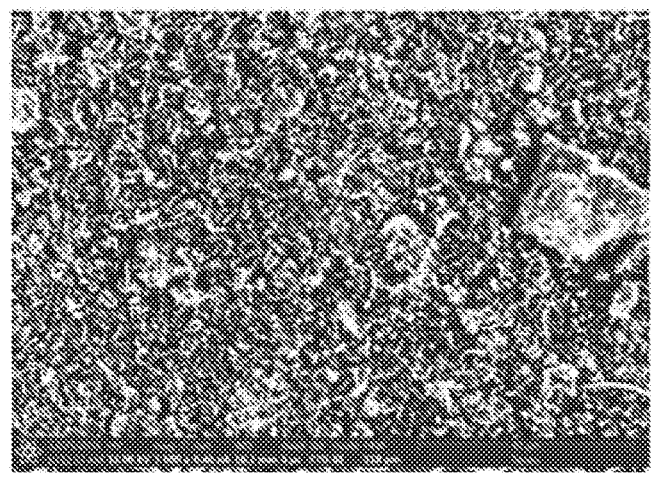
FIG. 4A shows an SEM image of a carbon nanotube product produced with a bare (zinc free) cathode.

Fine powder (~5 µm, rather than 50 µm) nickel metal powder is observed to promote better carbon nanotube growth in the system 100 in FIG. 1A. FIG. 4A shows a scanning electron microscope image of the carbon nanotube product produced with a bare (zinc free) cathode. The image in FIG. 4A was taken with a horizontal 118 µm field of view. In addition, no nickel powder was added to the electrolyte. As may be seen in FIG. 4A, use of the bare cathode does not form observable carbon nanotube product without nickel powder in the electrolyte.

Figure 4B:
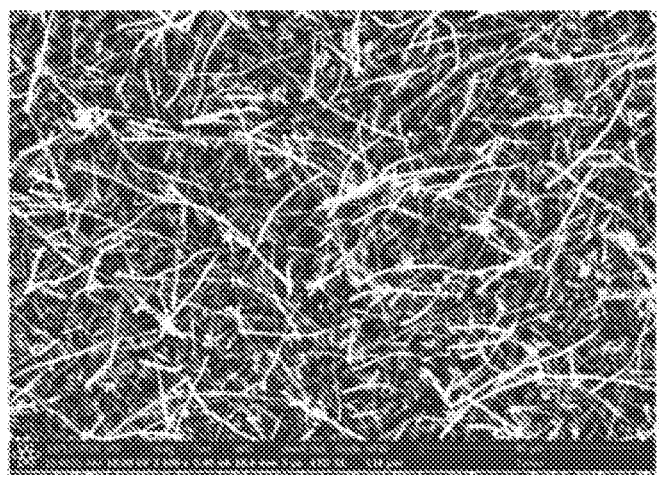
FIGS. 4B and 4C are SEM images of a highly uniform carbon nanotube product produced by adding nickel powder to the electrolyte.
Figure 4C:
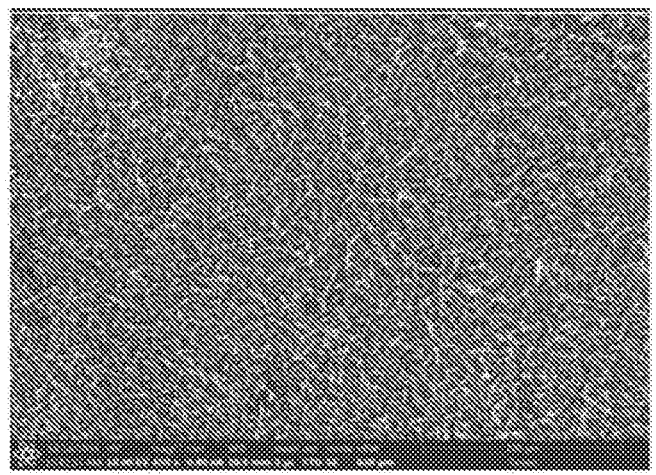

FIG. 4B is an SEM image of a highly uniform carbon nanotube product produced using the addition of a low level (0.1 wt %) 3-7 µm nickel powder to the electrolyte. The image in FIG. 4B was taken with a horizontal 118 µm field of view. FIG. 4C is a close up image at a higher magnification (wider 638 µm field of view) of the carbon nanotube product in FIG. 4B. The process used to produce the products shown in FIGS. 4A and 4B were 0.5 A, 24 hour (12 Ah) electrolyses conducted using an iridium anode and a Monel cathode in 770° C. $Li_2CO_3$ electrolyte. Neither of the processes added a zinc cathode coating to the cathode. The carbon nanotubes are formed during the electrosynthesis process.

The images in FIGS. 4B and 4C show that even a low level (0.1 wt %) of Ni powder added to the $Li_2CO_3$ electrolyte in FIG. 1A promotes carbon nanotube growth. To ensure that no nickel is in the system other than that added as nickel powder, an iridium anode, rather than nickel or nickel alloy anode, was used in the electrosynthesis producing the product shown in FIGS. 4B and 4C. Iridium is also an effective (albeit expensive) oxygen electrode for the carbonate system. FIGS. 4B and 4C show that the carbon nanotubes produced are highly uniform and of high purity carbon nanotubes. In each of the subsequent tests, Ni powder was utilized in the experiment, and each used 770° C. molten lithium carbonate without further (than Ni powder) additives.

The new carbon nanotube electrosynthesis methodology bypasses the need for a zinc coating on the cathode with the addition of a carbon nanotube growth elongation element or elements such as anode and cathode alloys or the addition of transition metal (or their salts) powders to the electrolyte. The new methodology accomplishes direct activation of the carbon nanotube growth with a simple addition of powders of transition metals or their salts to the electrolyte. This opens a pathway to explore the effect of (uncoated) cathode composition variation on the carbon nanotube product produced by the process explained above with reference to FIG. 1A. The effect is dramatic varying from no carbon nanotubes produced to the first observation of macroscopic electrosynthesized carbon nanotubes.

The carbon nanotube yields from using eight cathodes of different materials in the system in FIG. 1A were compared. The eight cathodes included (i) Monel, (ii) copper, (iii) graphite foil; (iv) nickel; (v) nickel-chromium; (vi) galvanized steel; (vii) titanium); and (viii) pure iron wire. The graphite foil is cut as a 5 cm² disc for the cathode that produced the carbon nanotube product formed using graphite foil cathode. The carbon nanotubes were produced using coiled wire 5 cm² discs of the respective copper, monel, nickel chromium, iron and titanium cathodes. In each case a higher concentration of Ni powder (0.8 wt %, rather than the 0.1 wt % in the images in FIGS. 4B and 4C of the carbon nanotubes was added to further promote carbon nanotube growth.

Only one cathode, the monel cathode, yielded long straight carbon nanotubes and one cathode, the copper cathode, yielded long tangled carbon nanotubes during extended electrolysis. The titanium cathode yielded shorter and only moderate quality carbon nanotubes, while a graphite foil cathode yielded high quality, but shorter carbon nanotubes during extended electrolysis. Subsequent to electrolysis and washing of the cathode product, the Monel, copper and graphite foil cathodes produced a high yield (≥85%) of carbon nanotubes. The nickel, nickel-chromium and galvanized steel cathodes produced a good yield (≥75%) of carbon nanotubes. The titanium cathode produced an intermediate (~40%) carbon nanotube yield, and the pure iron wire cathode consistently produced a poor yield (<30%) carbon nanotube yield.

Figure 5A:
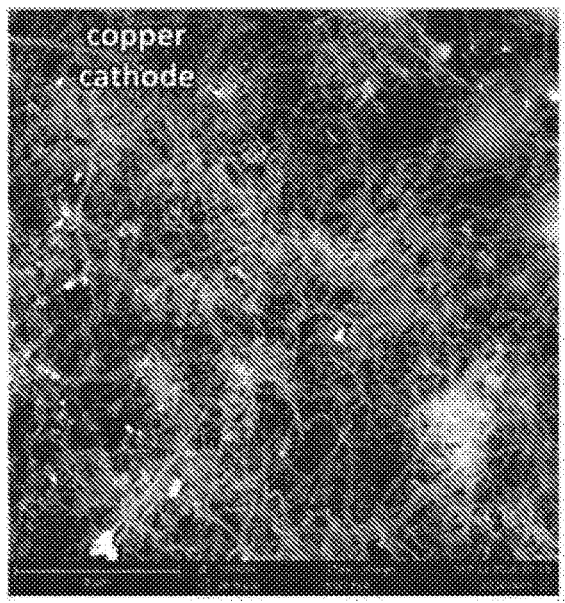
FIGS. 5A-5G are SEM images of carbon nanotube product produced using cathodes of different metals or alloys.
Figure 5B:

FIG. 5A and FIG. 5B are SEM images of carbon nanotubes produced with copper and Monel cathodes respectively. The carbon nanotubes shown in FIGS. 5A and 5B were produced using the system in FIG. 1A during short duration 0.3 Ah cm$^{-2}$ electrolysis in 770° C. $Li_2CO_3$.

As seen in the images in FIGS. 5A and 5B, while the Monel and copper cathodes both produce a high yield of carbon nanotubes, the carbon nanotube morphology is entirely different after 1.5 hours of electrolysis time (at 1 amp constant current between the 5 cm² electrodes). A pure nickel cathode (not shown) produces a result similar to that of the copper cathode in FIG. 5A although the carbon nanotube yield (80 to 85%) is less than that of the ≥85% yield of the copper cathode. As seen on the image in FIG. 5A, the copper cathode forms thin, tangled carbon nanotubes. In contrast, as shown in the image in FIG. 5B, the Monel cathode forms uniform, thicker and straight carbon nanotubes.

In particular, each of three separate effects from carbon nanotube growth elongation elements tend to produce macroscopic length carbon nanotubes during extended electrolysis in molten carbonate. The three effects are (1) choice of cathode; (2) addition of smaller ~5 µm, rather than 50 µm, nickel metal powder to the electrolyte; and (3) use of a Ni—Cr anode, rather than a pure Ni anode. As previously explained, a galvanized steel cathode results in straight carbon nanotubes during shorter electrolyses, but produces thick, convoluted, and not lengthened carbon nanotubes during longer electrolyses.

Figure 5C:
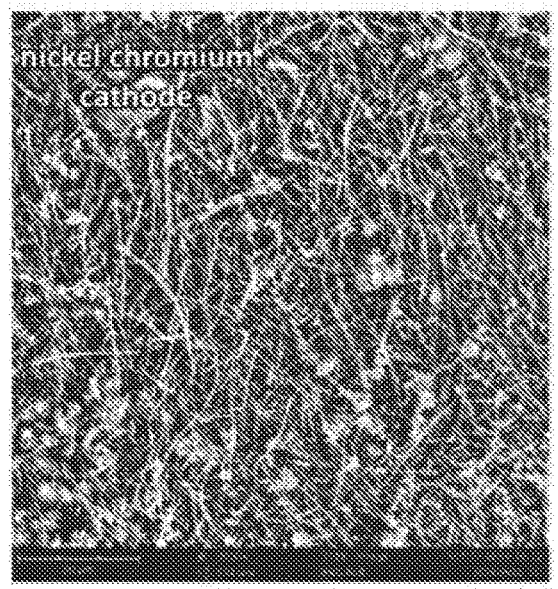
Figure 5D:
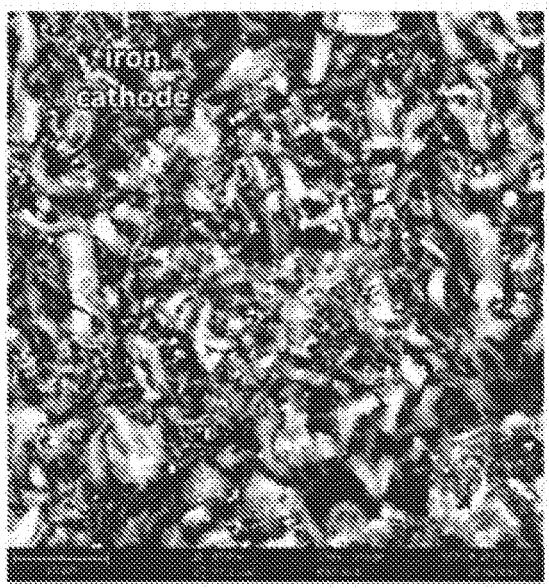

FIGS. 5C and 5D are SEM images of the carbon nanotube product produced using a nickel chromium alloy cathode and an iron cathode respectively. The cathodes were used to produce the carbon nanotube product shown in images FIG. 5C and FIG. 5D using electrolyses of 770° C. $Li_2CO_3$ electrolyte. The carbon nanotube product formed from the nickel chromium alloy cathode is formed during an intermediate duration (0.8 Ah $cm^{-2}$).

As shown by the image in FIG. 5D, even for short duration electrolysis (0.2 Ah $cm^{-2}$) the carbon product is highly heterogeneous when formed at the iron cathode. The nickel chromium cathode provides straighter carbon nanotubes than a pure nickel cathode, and as shown in FIG. 5C, the nickel chromium cathode continues to produce straight carbon nanotubes during intermediate duration electrolyses. Unlike the Monel cathode, carbon nanotubes produced from a nickel chromium cathode did not continue to grow during extended electrolytes.

Figure 5E:
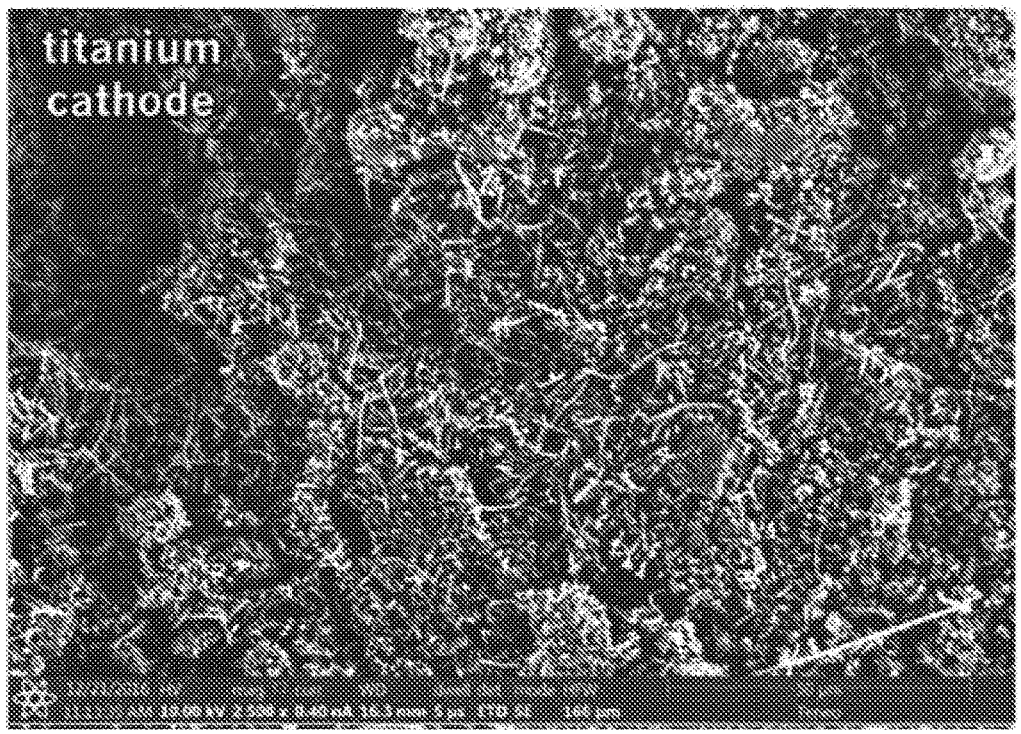
Figure 5F:
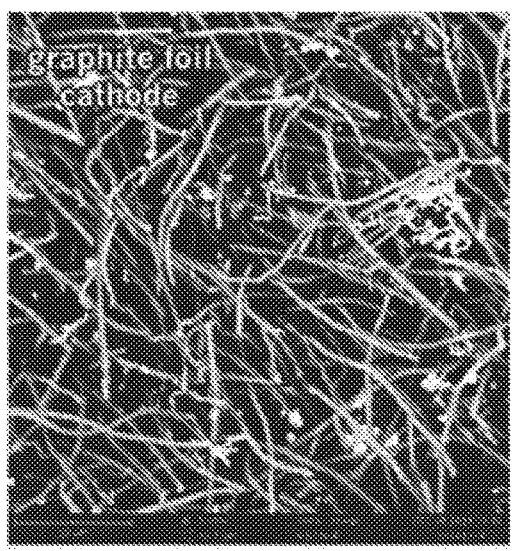
Figure 5G:
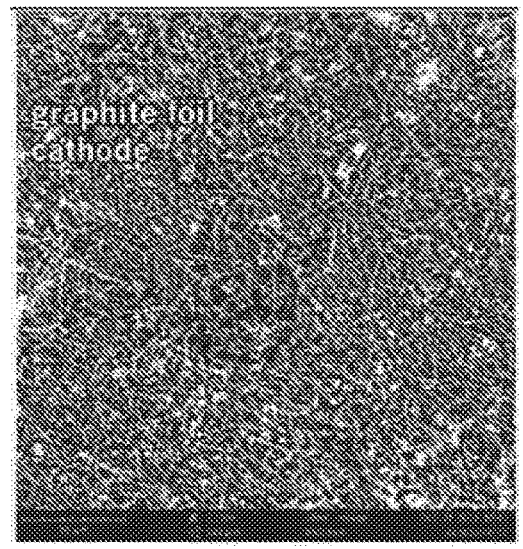

FIG. 5E shows an SEM image of a carbon nanotube product formed using a titanium cathode. FIGS. 5F and 5G show an SEM image of a carbon nanotube product formed using a graphite foil cathode. The images in FIGS. 5E-5G were taken after the process of extended 0.5 A, 48 h (24 Ah, 0.48 Ah $cm^{-2}$) electrolyses in 770° C. $Li_2CO_3$ electrolyte was performed.

As seen in the SEM image in FIG. 5E, the titanium cathode yielded shorter and only moderate quality carbon nanotubes. In contrast, the graphite foil cathode yielded high quality, but shorter (than a Monel cathode) carbon nanotubes subsequent to these extended electrolysis as shown in FIGS. 5F and 5G.

Another eight other similar alloys for potential cathodes from Online Metals (online metals.com) were used for further data comparison. The eight additional alloys included (i) Nickel silver (55% Cu, 27% Zn, 18% Ni); (ii) Brass 260 (70% Cu, 30% Zn); (iii) Naval Brass 464 (61% Cu, 39.25% Zn, 0.75% Sn); (iv) Ni K500 (463% Ni, 27-33% Cu, 2.3-3.15% Al, max 2.0% Fe, 1.5% Mn, 0.5% Si); (v) Cu 182 (99.1% Cu, 0.9% Cr) Online Metals; (vi) Munz metal (brass) (61% Cu, 40% Zn, trace iron); (vii) Cu 715 (30% Ni, 70% Cu) (MARMETAL); and (viii) Cu 706 (10% Ni, 90% Cu) (MARMETAL). Subsequent to 770° C. molten lithium carbonate electrolysis the Munz brass produces carbon nanotubes of macroscopic dimensions approaching, but not as large as, the Monel cathode. In another example the 30% Ni, 70% Cu alloy cathode produces a single product carbon nanotubes containing both short and macroscopic nanotubes reminiscent of those produced by both pure copper and Monel cathodes.

Figure 6:
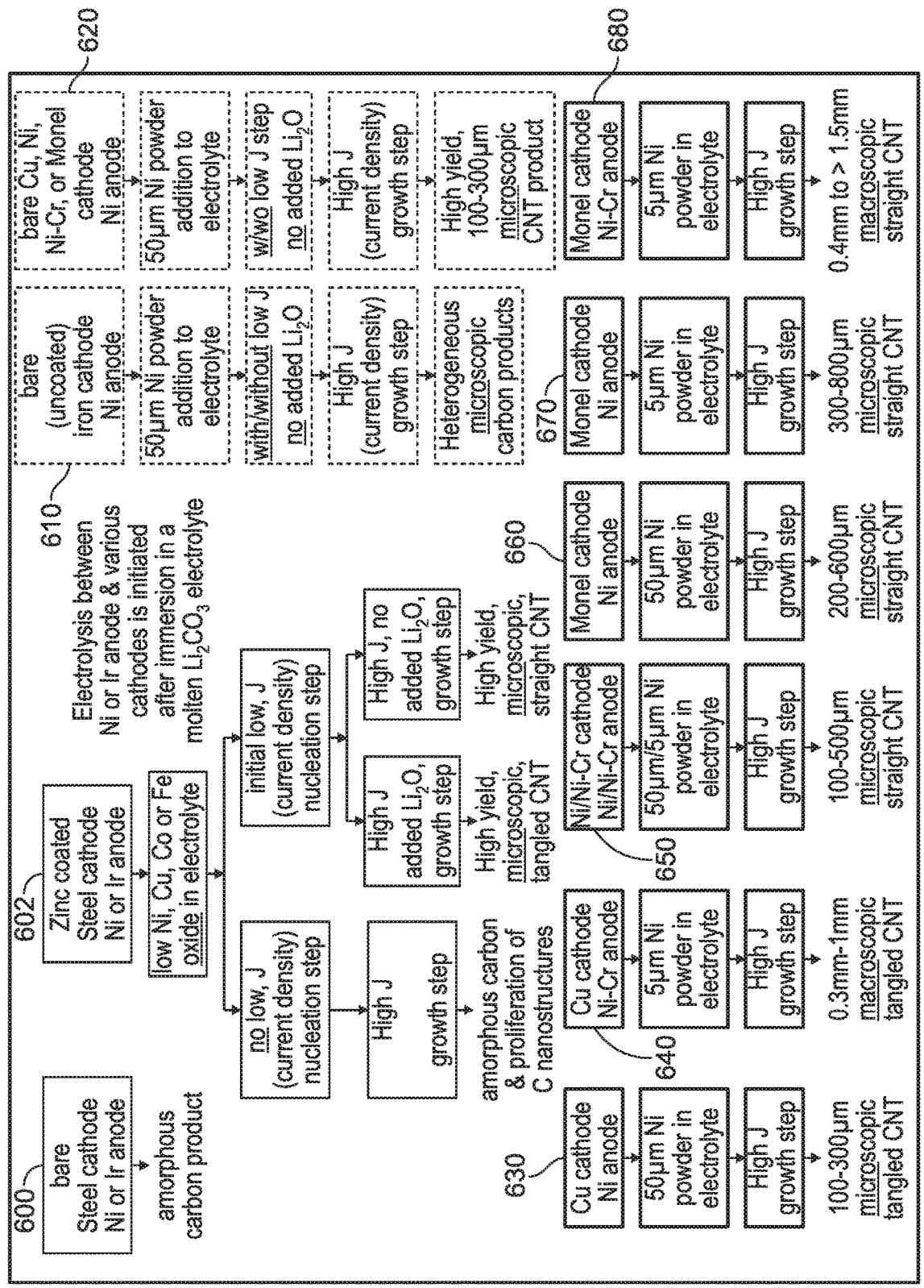
FIG. 6 is a schematic of known and new synergistic pathways to form macroscopic length straight or tangled carbon nanotube carbon by electrolysis in molten carbonate.

FIG. 6 is a schematic representation of known and new synergistic pathways to form macroscopic length straight or tangled carbon nanotube carbon by electrolysis in molten carbonate. FIG. 6 shows known synthetic sequence pathways 600 and 602. These pathways 600 and 602 used a (i) coated zinc cathode, (ii) transition metal oxide in the electrolyte, and (ii) a low current density nucleation step to produce straight carbon nanotubes, and (ii) the addition of $Li_2O$ to produce tangled CNTs via molten carbonate electrolysis. The known pathways 600 and 602 form known pure carbon morphologies by electrolysis from molten lithium carbonate. Less soluble nucleating agents, such as nickel or cobalt oxides in molten carbonates in the known pathway 602, lead to readily controlled growth of uniform carbon nanotubes. Alternatively, highly soluble agents, such as iron oxide, which is soluble up to 9 molal, as $LiFeO_2$, in molten $Li_2CO_3$, lead to the uncontrolled growth of a profusion of nanostructures.

FIG. 6 also shows synthetic sequences 610 and 620 that feature the direct addition of a transition metal powder, such as nickel powder, to the electrolyte. This removes the necessity of a coated zinc cathode, a transition metal oxide in the electrolyte and a low current density nucleation step in synthesis of carbon nanotubes and permits different bare cathodes to be explored.

FIG. 6 also shows new synergistic pathways 630, 640, 650, 660, 670 and 680 that are processes to produce long length carbon nanotubes in comparison with currently known processes. The example processes to produce long length carbon nanotubes differs from known molten carbonate carbon nanostructure based processes. In known processes, transition metal nucleating agents are reduced from their dissolved cations onto the cathode during carbonate electrolysis. This reduction initiates carbon nanostructure growth as shown in the pathways 600 and 602 in FIG. 6.

The pathways 610 and 620 both use a nickel anode. The pathway 610 uses an iron cathode while the pathway 620 uses a bare Copper, Nickel, Nickel-chromium or Monel cathode. Both the pathways 610 and 620 add 50 µm nickel powder to the electrolyte and include a low current density (J) step with a high current density growth step.

As may be seen in the pathways 610 and 620 top right corner of FIG. 6, the addition of a single carbon nanotube growth elongation element such as the nickel powder alone will not produce a macroscopic length carbon nanotube product. Hence the dispersion of a transition metal powder, such as nickel powder addition, only produces a 100 to 300 µm carbon nanotube product.

The new synergistic pathways 630, 640, 650, 660, 670 and 680 in FIG. 6 are based on the type of cathode and anode used in the respective process. The pathways 630, 640, 650, 660, 670 and 680 allow production of macroscopic length carbon nanotube products.

It is the synergistic combination of multiple elongation elements, such as the addition of nickel powder together with specific anode and cathode materials as shown by the pathways 630, 640, 650, 660, 670 and 680 that produces the macroscopic length carbon nanotubes.

The pathway 630 uses a copper cathode and nickel anode and larger diameter nickel powder in the electrolyte with a high current density step. This pathway 630 results in production of tangled microscopic length carbon nanotubes. The pathway 640 uses a copper cathode and a nickel chromium anode and smaller nickel powder with a high current density step. The result production of carbon nanotubes of macroscopic length. The pathway 650 uses larger Ni powder with a nickel-chromium cathode and anode or a nickel cathode and anode. As may be seen by the pathways 630 and 640, straight carbon nanotubes are produced with either nickel or nickel-chromium cathodes, and longer, but not macroscopic length carbon nanotubes are produced with the a nickel-chromium anode and smaller diameter nickel powder in the electrolyte.

The pathways 660, 670 and 680 use Monel cathodes. The pathway 660 uses a larger (50 µm) diameter nickel powder in the electrolyte along with a high current density growth step. The pathway 670 uses a smaller (5 µm) diameter nickel powder in the electrolyte along with a high current density growth step. The pathway 680 uses a nickel-chromium anode, a smaller (50 µm) diameter nickel powder in the electrolyte along with a high current density growth step. As may be seen in the pathway 680, Monel cathodes yield the longest (macroscopic) length, straight carbon nanotubes with the three synergistic effects of a Monel cathode, small diameter nickel powder in the electrolyte and the nickel chromium anode.

Figure 7:
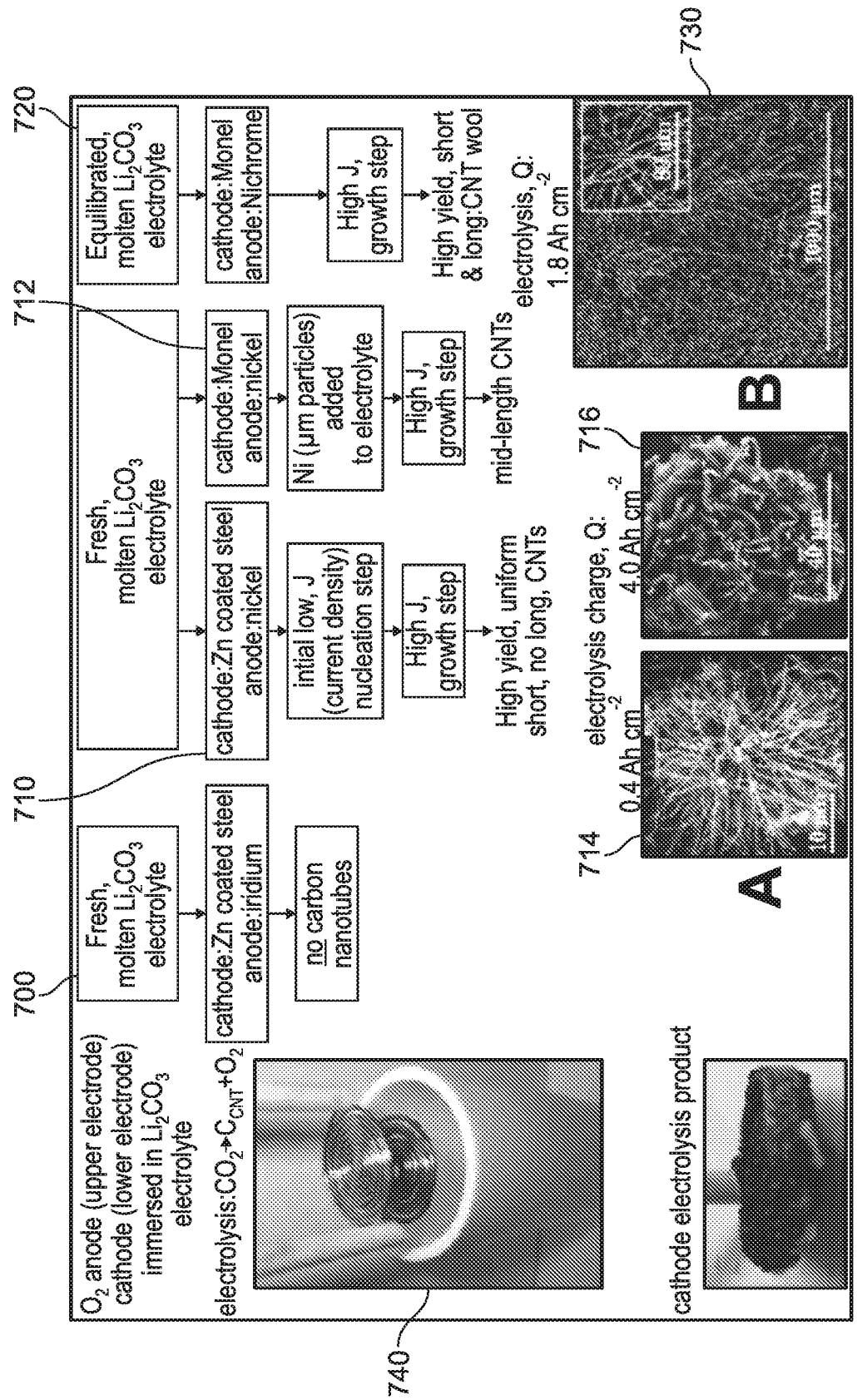
FIG. 7 is a schematic of synergistic pathways including carbon nanotube wool growth without the addition of nickel particles.

FIG. 7 shows a schematic of prior pathways 700, 712 and 714 and a new example synergistic pathway 720. The prior pathway 700 is the previous use of a zinc coated steel cathode and an iridium anode that resulted in no carbon nanotube production. The pathway 710 uses a zinc coated steel cathode and nickel anode with a low current density and high current density that resulted in high yield uniform, but short carbon nanotubes as shown in an SEM image 714. The pathway 712 uses a Monel cathode and nickel anode with nickel particles added to the electrolyte to produce mid-length carbon nanotubes as shown in SEM image 716. The pathways 710 and 712 removes the requirement of a zinc coating leading to the exploration of a variety of new cathode substrates.

In contrast, the new pathway 720 uses a monel cathode and a nickel-chromium anode with a high current density growth step to form a high yield of macroscopic length carbon nanotube "wool" by electrolysis in molten carbonate. The pathway 720 includes molten electrolyte equilibration for 24 h, and the electrolysis is conducted directly without pre-electrolysis activation steps. This pathway produces a high yield of macroscopic length carbon nanotube wool as shown in the SEM image 730. An experimental cell configuration 740 is used in experiments to demonstrate the pathways 700, 710, 712 and 720.

As explained above, the anode 112 in FIG. 1A is preferably a nickel-chromium alloy. Such an alloy may contain 10% nickel to 90% nickel and 10% chromium to 90% chromium. However, the anode 112 may also be a nickel copper alloy that contains 10% nickel to 90% nickel and 10% copper to 90% copper. Alternatively, the anode 112 may be a nickel iron alloy that contains 10% nickel to 90% nickel and 10% iron to 90% iron.

In another example, the anode 112 in FIG. 1A may be an air anode. In rechargeable Li air or Zn air batteries, the air electrode acts as a cathode (causing reduction, consuming oxygen from the air) during the charging sequence and as an anode (causing oxidation releasing oxygen) during the discharge component of the battery cycle. The air anode in this example is similar to the action of those air electrode oxidation sequences in that oxygen is released during the electrolysis of carbonate.

Further, it is useful to "age" the electrolyte in FIG. 1A for a predetermined time such as 24 hours prior to performing the electrosynthesis. The transition metal particles such as the nickel particles are added to the electrolyte prior to aging. Aging leads to a higher yield of elongated carbon nanotubes, and without being bound to any theory provides conditions for the self repair and continued growth of carbon nanotubes.

Subsequent to electrolysis the product remains on the cathode, but falls off with congealed electrolyte when a coiled wire cathode is extracted, cooled, and uncoiled, or simply pealed off from a planar Monel cathode. Processes that help avoid electrolyte congealing on the product and tend to exclude molten electrolyte while extracting the product hot include bubbling gas through the cathode. One example of bubbling gas may be increasing the temperature while continuing the end of the electrolysis. There is a smooth transition from the solid carbon cathode reduction product in the 700° C. range to gaseous carbon monoxide in the 900° C. range, and intermediate temperature allows their coformation. At 850° C. and 900° C. the solid carbon to the CO product ratios were observed to be 2:1 and 0.5 to 1, respectively and at 950° C., CO is the sole product.

Alternatively, at, and near, the electrolysis temperature, the viscous carbon/electrolyte mix on the cathode readily scrapes off the cathode. A second method to avoid electrolyte congealing is the filtration of the hot molten electrolyte/ carbon product mix through a high mesh size, small pore filter (such as nickel, nickel alloy, steel or ceramic) which separates carbon clusters from molten electrolyte. A hot solid state molten electrolyte absorbent in contact under the filter is particularly effective at drawing out the molten electrolyte. One example is BNZ 2300 firebricks which are temperature resistant and porous. Reversing the polarity of the cathode and the anode may generate $O_2$ to drive out the electrolyte, although this competes with oxidation of the carbon product.

Several aqueous washing routes are equally viable to separate any congealed (water soluble) electrolyte from the insoluble carbon nanotubes and are summarized here. Whereas the product of lithium carbonate and either formic acid or HCl acid, lithium formate or lithium chloride, have a high aqueous solubility at 20° C., the solubility of lithium carbonate is relatively low in pure water, (respectively $LiHCO_2$, LiCl and $Li_2CO_3$ dissolve to 39.3 g, 83.5 g and 1.3 g per 100 g $H_2O$). The solubility of lithium carbonate increases in cold water to 1.5 g at 0° C. and decreases to 0.8 g at 85° C., but that of lithium formate and lithium chloride increase with temperature (to 138 g and 128 g per 100 g $H_2O$ respectively at 100° C.), and this higher washing temperature does not affect the stable carbon nanotube product. Hence, the product is washed with cold deionized water, or more quickly washed with small amounts of hot HCl (forming lithium chloride) or hot formic acid (forming lithium formate) to dissolve electrolyte that had congealed with the product, and the product is dried. Alternatively, the product is cleaned via the higher than pure water solubility of lithium carbonate in aqueous ammonium sulfate. The lithium carbonate dissolves in 4.46 molal (moles $(NH_4)_2SO_4$ per kg $H_2O$) at 6.7 g, 6.8 g, 7.1 g and 7.9 g $Li_2CO_3$/100 g H2O at 25, 50, 75 and 100 C. Ammonium sulfate solubility increases with temperature, to 6.45 m at 100° C. and 6.64 m at 108.5 C, and also dissolves more lithium carbonate, respectively 11.4 and 11.6 g $Li_2CO_3$/100 g $H_2O$ at 100 and 108.5° C. As a final aqueous alternative, the lithium carbonate electrolyte is removed as lithium bicarbonate ($LiHCO_3$, formed as aqueous $Li_2CO_3$ under higher $CO_2$ partial pressure than in air, for example $Li_2CO_3$ under 1 bar of $CO_2$ has a 20° C. solubility of 4.6 g per 100 g $H_2O$). In this latter case, the carbon nanotube product is washed at higher pressure, which dissolves out the $Li_2CO_3$ as the bicarbonate. The washing solution is then removed to lower pressure, which then separates, by precipitation, $Li_2CO_3$. This high/low pressure sequence cycle is repeated as necessary.

As explained above, tangled carbon nanotubes are formed at a copper cathode and straight carbon nanotubes are formed at Monel cathode used in the electrolysis process. Monel cathodes yield the longest (macroscopic) length, straight carbon nanotubes with the three synergistic effects of the cathode composition, the small nickel powder addition to the electrolyte, and use of a nickel chromium, rather than nickel anode. The nickel chromium alloy anode better controls the formation of the electrocatalytic oxide layer at the air electrode/electrolyte interface during the extended electrolysis enhancing the carbon nanotube growth process. Based on separate measured optical microscopy, it is evident that the synthesized macroscopic carbon nanotubes are 1 mm or significantly longer in length.

In the example system in FIG. 1A, the carbon nanotubes produced by the methods described above produces a product that can be described as "carbon nanotube cotton" or "carbon nanotube wool" which are interchangeable terms. This carbon nanotube cotton, is even more evident once the product has been washed, for example, by using a solvent such as water or any other solvent known to one of ordinary skill in the art for washing carbon fibers.

Carbon nanotube cotton is a material that has the feel and texture of cotton, wool or plant fiber. Like cotton or wool, carbon nanotube cotton also has spinning properties that are like cotton, wool, or plant fiber in that the carbon nanotube cotton may be spun into threads and wires. These threads and wire can be weaved into cloths or sheet like material which, in turn, can be layered, glued, stitched, combined and further woven into many materials of different rigid, semi-rigid and soft shapes with high strength for uses such as lightweight bullet proof clothing. Such materials may be used for blast and fracture resistant composites. The cloths may also be used for applications requiring high electrical conductivity such as electric shock (faraday cage) clothing.

The facile high yield, low energy, synthesis of macroscopic length carbon nanotubes may be accomplished by the above processes. These longer carbon nanotubes are suitable for weaving into carbon cloths and composites and are produced from $CO_2$ by molten carbonate electrolysis. This removes both atmospheric and/or anthropogenic carbon dioxide from the environment. The substantial effect of the cathode composition is demonstrated both on carbon nanotube morphology and on carbon nanotube length. The activation effect equivalent to that of galvanized (zinc plating) is accomplished without a zinc coating. This opens the pathway to study a wide variety of alternative non-coated cathode electrodes. This activation is accomplished by the addition of fine, nickel powder to the electrolyte, and also replaces the previous addition of transition metal nucleating agent additives as either oxides or via corrosion of the oxygen anode.

Prior to the described example processes, a collection of macroscopic length carbon nanotubes has never before been produced by molten carbonate electrolysis. The choice of cathode material is critical and a determining factor in the synergism allowing the production of uniform, long length, carbon nanotubes. Some cathode materials, such as copper, produce interesting, but tangled morphologies when additives, such as lithium oxide were additionally dissolved in the electrolyte. Others, such as pure Ni, produce uniform carbon nanotubes for short duration, but not long duration electrolysis, while Monel, an alloy of nickel and copper and small amounts of iron, manganese, carbon and silicon, cathode, as shown by SEM microscopy in FIG. 2B, produces uniform, very long (macroscopic, >1 mm in length) CNTs, proportional in length to the electrolysis time (under other fixed conditions of temperature, electrolyte and current density).

The carbon fiber may be made very long such as up to 5 mm, up to 1 cm, up to 2 cm, up to 5 cm, up to 10 cm, or up to 1 meter or longer. Rather than the particle/powder nature of all prior carbon products, the washed cathode of the product now exhibits a fleece-like or cotton-like fibrous character. This expanded, fibrous character is similar to other materials used for example in combining, braiding or weaving into wire, cables, wires or cloths. As seen in the image 230 in FIG. 2, the washed cathode product subsequent to a lower charge (6 Ah, rather than 12 Ah) electrolysis exhibits proportionally shorter carbon nanotubes.

The terminology used herein is for the purpose of describing particular embodiments only, and is not intended to be limiting of the invention. As used herein, the singular forms "a" "an" and "the" are intended to include the plural forms as well, unless the context clearly indicates otherwise. Furthermore, to the extent that the terms "including", "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for producing elongated macroscopic carbon nanotubes comprising:
   heating a carbonate electrolyte to obtain a molten carbonate electrolyte;
   disposing the molten carbonate electrolyte between an anode and a cathode in a cell;
   applying an electrical current to the cathode and the anode in the cell; and
   collecting carbon nanotube growth from the cathode of the cell,
   wherein the method includes
   (a) the molten carbonate electrolyte consists essentially of a transition metal powder;
   (b) the cathode comprises copper, a nickel copper alloy, a nickel chromium alloy, or a brass alloy, and
   (c) the anode comprises a nickel chromium alloy, a nickel copper alloy, or a nickel iron alloy.

2. The method of claim 1, wherein said alloy of the anode is a nickel copper alloy and contains 10% nickel to 90% nickel and 10% copper to 90% copper.

3. The method of claim 1, wherein said alloy of the anode is a nickel chromium alloy and contains 10% nickel to 90% nickel and 10% chromium to 90% chromium.

4. The method of claim 1, wherein said alloy of the anode is a nickel iron alloy and contains 10% nickel to 90% nickel and 10% iron to 90% iron.

5. The method of claim 1, wherein the molten carbonate electrolyte has a melting point between about 150° C. and about 900° C.

6. The method of claim 1, wherein the molten carbonate electrolyte consists essentially of lithium carbonate.

7. The method of claim 1, wherein the molten carbonate electrolyte consists essentially of at least one material selected from the group consisting of: lithium carbonate; sodium carbonate; potassium carbonate; strontium carbonate; rubidium carbonate; cesium carbonate; barium carbonate; and calcium carbonate, and any combination thereof.

8. The method of claim 1, wherein the produced carbon nanotubes are longer than 1 mm in length.

9. The method of claim 1, wherein the carbon nanotubes are a cluster of untangled carbon nanotubes.

10. The method of claim 1, wherein the carbon nanotubes are a cluster of tangled carbon nanotubes.

11. The method of claim 1, further comprising cleaning the carbon nanotubes with a solvent.

12. The method of claim 1, further comprising separating carbon nanotubes from the carbon nanotube growth.

13. The method of claim 1, further comprising separating carbon nanotube cotton from the carbon nanotube growth.

14. The method of claim 13, further comprising spinning spun fiber from the carbon nanotube cotton.

15. The method of claim 1, further comprising fabricating a composite material comprising carbon nanotubes collected from the carbon nanotubes.

16. The method of claim 15, wherein the composite material is a carbon cloth.

17. The method of claim 15, wherein the composite material is a carbon cable.

18. The method of claim 15, wherein the composite material is a carbon wire.

19. The method of claim 1, further comprising aging the molten carbonate electrolyte for a predetermined amount of time prior to applying the electrical current.

20. The method of claim 1, wherein the anode further comprises at least one material selected from the group consisting of: manganese; titanium; zirconium; molybdenum; tantalum; cobalt; silicon; carbon, and any combination thereof.

21. The method of claim 1, wherein the anode further comprises at least two materials selected from the group consisting of: manganese; titanium; zirconium; molybdenum; tantalum; cobalt; silicon; carbon, and any combination thereof.

22. The method of claim 1, wherein the cathode does not have a zinc coating.

23. The method of claim 22, wherein the transition metal powder is selected from nickel, chromium, iron, cobalt, manganese, titanium, zirconium, copper, vanadium, zinc, molybdenum, scandium, ruthenium, tantalum, and alloys thereof.

24. The method of claim 1, wherein the method is conducted at an electrolysis temperature of between 700° C. and 900° C.

25. A method for producing a macro length carbon nanotube comprising:
providing a carbonate electrolyte including transition metal powder between a nickel alloy anode and a nickel alloy cathode contained in a cell;
heating the carbonate electrolyte to a molten state;
applying an electrical current to the nickel alloy anode, nickel alloy cathode, and the molten carbonate electrolyte disposed between the anode and cathode; and
collecting carbon nanotube growth from the cathode of the cell.

26. The method of claim 25, wherein the nickel alloy of the anode is a nickel copper alloy and contains 10% nickel to 90% nickel and 10% copper to 90% copper.

27. The method of claim 25, wherein the nickel alloy of the anode is a nickel chromium alloy and contains 10% nickel to 90% nickel and 10% chromium to 90% chromium.

28. The method of claim 25, wherein the nickel alloy of the anode is a nickel iron alloy and contains 10% nickel to 90% nickel and 10% iron to 90% iron.

29. The method of claim 25, wherein the transition metal powder includes particles of at least one material selected from the group consisting of: nickel; chromium; iron; cobalt; manganese; titanium; zirconium; copper; vanadium; zinc; molybdenum; scandium; ruthenium; tantalum; and alloys and mixtures thereof.

30. The method of claim 25, wherein the transition metal powder includes particles of at least two materials selected from the group consisting of: nickel; chromium; iron; cobalt; manganese; titanium; zirconium; copper; vanadium; zinc; molybdenum; scandium; ruthenium; tantalum; and alloys and mixtures thereof.

31. The method of claim 25, wherein said transition metal powder has a diameter of 10 μm or larger.

32. The method of claim 25, wherein said transition metal powder has a diameter of 1 to 10 μm.

33. The method of claim 25, wherein said transition metal particle has a diameter of less than 1 μm.

34. A method for producing elongated carbon nanotubes comprising:
(i) applying an electrical current to a cathode and an anode which are disposed in a molten carbonate electrolyte, where the molten carbonate electrolyte consists essentially of a transition metal powder, to form carbon nanotubes having a length of at least 0.4 mm, where
(a) the cathode comprises copper, a nickel copper alloy, a nickel chromium alloy, or a brass alloy, and
(b) the anode comprises a nickel chromium alloy, a nickel copper alloy, or a nickel iron alloy; and
(ii) collecting carbon nanotube growth from the cathode of the cell.

35. The method of claim 34, wherein the carbon nanotubes are longer than 1 mm in length.

36. The method of claim 34, wherein the transition metal powder is selected from nickel, chromium, cobalt, manganese, titanium, zirconium, copper, vanadium, zinc, molybdenum, scandium, ruthenium, tantalum, and alloys thereof.

* * * * *